Patented July 28, 1936

2,049,019

UNITED STATES PATENT OFFICE 2,049,019

PROCESS FOR IMPROVING HYDROCARBON MIXTURES

Mathias Pier, Heidelberg, Friedrich Christmann, Ludwigshafen-on-the-Rhine, and Ernst Donath, Mannheim, Germany, assignors to I. G. Farbenindustrie Aktiengesellschaft, Frankfort-on-the-Main, Germany No Drawing. Application July 11, 1933, Serial No. 679,935. In Germany July 14, 1932

8 Claims. (Cl. 87—9)

The present invention relates to a process for improving hydrocarbon mixtures, in particular lubricating oils.

It has already been proposed to improve lubricating oils by adding to them small amounts of a highly polymerized hydrocarbon having a high molecular weight of more than 800 and preferably of more than 2000 and which on heating to a temperature of up to 200° C. for a period of 5 minutes do not undergo any appreciable decomposition, such as hydrogenated natural or synthetic rubber, cyclo-rubber, hydrogenated oxygen-free resins or polymerization products of olefines. The said products, even when added to lubricating oils in but small amounts, generally speaking, effect a considerable increase in the viscosity and an improvement in the temperature-viscosity curve. These products having themselves a high viscosity are mainly suitable as additions to lubricating oils having a high flash-point.

We have now found that particular good results are obtained by adding to lubricating oils compounds obtained by a splitting hydrogenation of polymerization products of unsaturated hydrocarbons capable of forming polymeric homologous series or products obtainable therefrom by isomerization, as for example rubber, or polymerization products of diolefines, in particular butadiene, cyclo-rubber or polymerization products of olefines, such as butylene, isobutylene or styrene, or natural or artificial resins at temperatures above 300° C. and which have lubricating oil character. In order to obtain the said products, the conditions as regards pressure, speed of flow, duration of treatment, temperature and catalyst (if any) must be appropriately selected.

As a rule, the splitting is not carried so far that large amounts of substances having a molecular weight below 500 are formed. Preferably, the final products have a mean molecular weight less than 1000. This, of course, is only possible, if the particular initial materials employed have a molecular weight above the final mean molecular weight desired, preferably higher than 1000, since in the hydrogenation according to the present invention a conversion into lower molecular compounds takes place. The degree of the splitting action is advantageously adjusted to the nature of the lubricating oils to which the resulting products are to be added. For lighter oils, additions having a comparatively lower molecular weight are suitable, while heavier oils are preferably improved by the addition of higher molecular products. The said resulting products are usually added to the lubricating oils in amounts ranging between 1 and 10 per cent with reference to the said lubricating oils, but also smaller or larger amounts, as for example 20 or 25 per cent may be added. When added in amounts of 1 or 2 per cent the said products increase the viscosity of an oil from 1.95° Engler at 100° C. to not more than 2.35° or to 2.8° Engler, respectively, at 100° C.

The hydrogenation may be carried out for example at temperatures of from 300° to 350° C. or also higher temperatures up to 400° or 450° C. and under a pressure above 20 atmospheres, as for example 50, 100, 200 atmospheres or more. As catalysts may be mentioned those suitable for promoting the destructive hydrogenation, as for example metal compounds, such as oxides and sulphides, especially of metals of the 5th to the 8th groups, more particularly of the 6th group, of the periodic system either alone or in admixture with compounds of zinc, magnesium, aluminium, or titanium. The metal compounds may be arranged on carriers, such as silica, bauxite, diatomite, pumice stone, clay sherds or the like. Halogens or their compounds or volatile acids may also be employed, if desired in admixture with the said metal compounds. The resulting products have in part a considerably lower molecular weight than the products obtained by hydrogenation without considerable splitting. They have the advantage that when added to oils of low viscosity such as spindle oils or machine oils, they increase the viscosity and the viscosity index to a desirable extent without causing thickenings in the oils when in use.

When adding the products to lubricating oils containing paraffin wax, it is advantageous also to add substances which lower the setting point, as for example those obtainable by condensation of hydrocarbons rich in hydrogen having at the most slight lubricating properties and a mean molecular weight of at least 170 as described in the copending application Ser. No. 480,284, filed September 6th, 1930 or those obtainable by subjecting waxy substances in particular soft or hard paraffin wax to the action of silent electric discharges, as described for example in the copending application Ser. No. 651,802, filed January 14th, 1933.

The products obtained according to the present invention may also be added in small amounts to other liquid hydrocarbon mixtures, such as benzines, whereby they increase their viscosity, act as surface lubricants and prevent wear.

The products may also be added to hydrocarbon mixtures such as solid paraffin wax. The additions should be in amounts of from about 0.1 to about 15 per cent, preferably from 1 to 10 per cent.

The following examples will further illustrate the nature of this invention but the invention is not restricted to these examples.

Example 1

Raw rubber is dissolved in cyclohexane, 5 per cent of a catalyst consisting of tungsten sulphide are added, the whole heated to 315° C. at an initial pressure of hydrogen of 150 atmospheres, and kept at the said temperature for 2 hours. After cooling, releasing the pressure, filtering off the catalyst and distilling off the solvent, a product is obtained which is mixed in an amount of 2 per cent with a German machine oil having a viscosity of 1.96° Engler at 100° C. and a viscosity index of 74. The mixture has a viscosity of 2.1° Engler at 100° C. and a viscosity index of 86.

Example 2

Manila copal is subjected to destructive hydrogenation in the manner described in Example 1, but at 325° C. The reaction product is added in an amount of 5 per cent to a further batch of the same machine oil. The mixture has a viscosity of 2.2° Engler at 100° C. and a viscosity index of 87.

What we claim is:—

1. A valuable product containing as main constituent a from liquid to solid hydrocarbon mixture and a small addition of a substance having a mean molecular weight above 500 which is obtained by splitting hydrogenation of a higher molecular substance selected from the group consisting of polymerization products of unsaturated hydrocarbons capable of forming polymeric homologous series and the products obtainable therefrom by isomerization.

2. A valuable product containing as main constituent a from liquid to solid hydrocarbon mixture and from 1 to 10 per cent of a substance having a mean molecular weight above 500 which is obtained by splitting hydrogenation of a higher molecular substance selected from the group consisting of polymerization products of unsaturated hydrocarbons capable of forming polymeric homologous series and the products obtainable therefrom by isomerization.

3. A valuable product containing as main constituent a lubricating oil and a small addition of a substance having a mean molecular weight above 500 which is obtained by splitting hydrogenation of a higher molecular substance selected from the group consisting of polymerization products of unsaturated hydrocarbons capable of forming polymeric homologous series and the products obtainable therefrom by isomerization.

4. A valuable product containing as main constituent a lubricating oil and from 1 to 10 per cent of a substance having a mean molecular weight above 500 which is obtained by a splitting hydrogenation of a higher molecular substance selected from the group consisting of polymerization products of unsaturated hydrocarbons capable of forming polymeric homologous series and the products obtainable therefrom by isomerization.

5. A valuable product containing as main constituent a lubricating oil and from 1 to 10 per cent of a substance having a mean molecular weight between 500 and 1000 which is obtained by a splitting hydrogenation of a higher molecular substance selected from the group consisting of polymerization products of unsaturated hydrocarbons capable of forming polymeric homologous series and the products obtainable therefrom by isomerization.

6. A petroleum product containing as its main constituent a hydrocarbon mixture having a consistency within the range of from liquid to solid and containing a small amount of a substance having a mean molecular weight above 500 obtained by a splitting hydrogenation of a natural gum.

7. A product according to claim 6 in which the natural gum is rubber.

8. As an article of manufacture, a hydrocarbon substance having utility as a viscosity improving agent in lubricating oils having a mean molecular weight above 500 and being obtained by a splitting hydrogenation of a higher molecular substance selected from the group consisting of polymerization products of unsaturated hydrocarbons capable of forming polymeric homologous series and the products obtainable therefrom by isomerization.

MATHIAS PIER.
FRIEDRICH CHRISTMANN.
ERNST DONATH.